T. G. CUMMINGS.
AUTOMATIC NAILING MACHINE.
APPLICATION FILED JAN. 4, 1911.

1,109,739.

Patented Sept. 8, 1914
10 SHEETS—SHEET 2.

Witnesses
Inventor: Thomas G. Cummings,
by: Attorney.

T. G. CUMMINGS.
AUTOMATIC NAILING MACHINE.
APPLICATION FILED JAN. 4, 1911.

1,109,739.

Patented Sept. 8, 1914.
10 SHEETS—SHEET 4.

Witnesses:

Inventor: Thomas G. Cummings
by Bradbury
Attorney

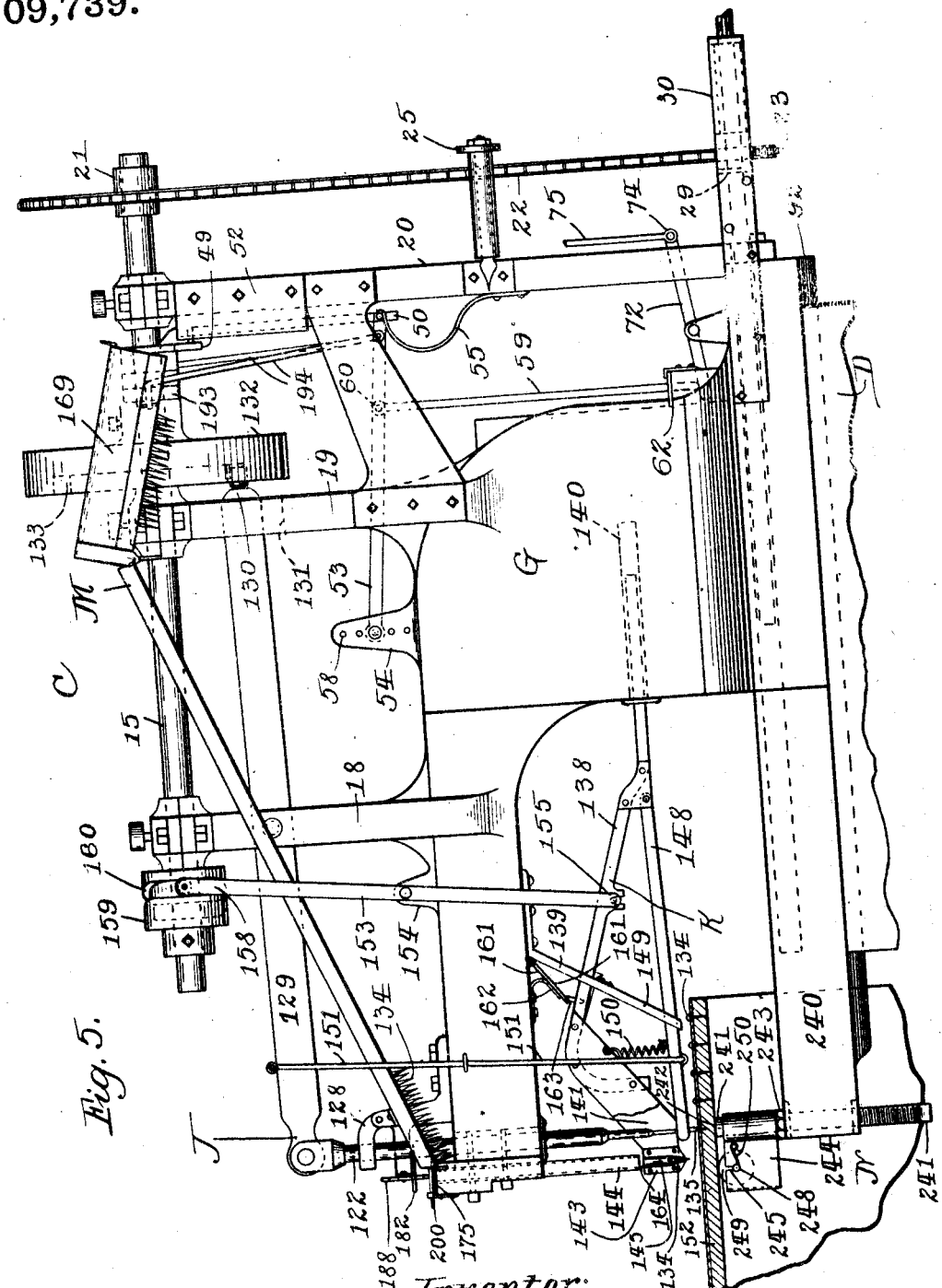

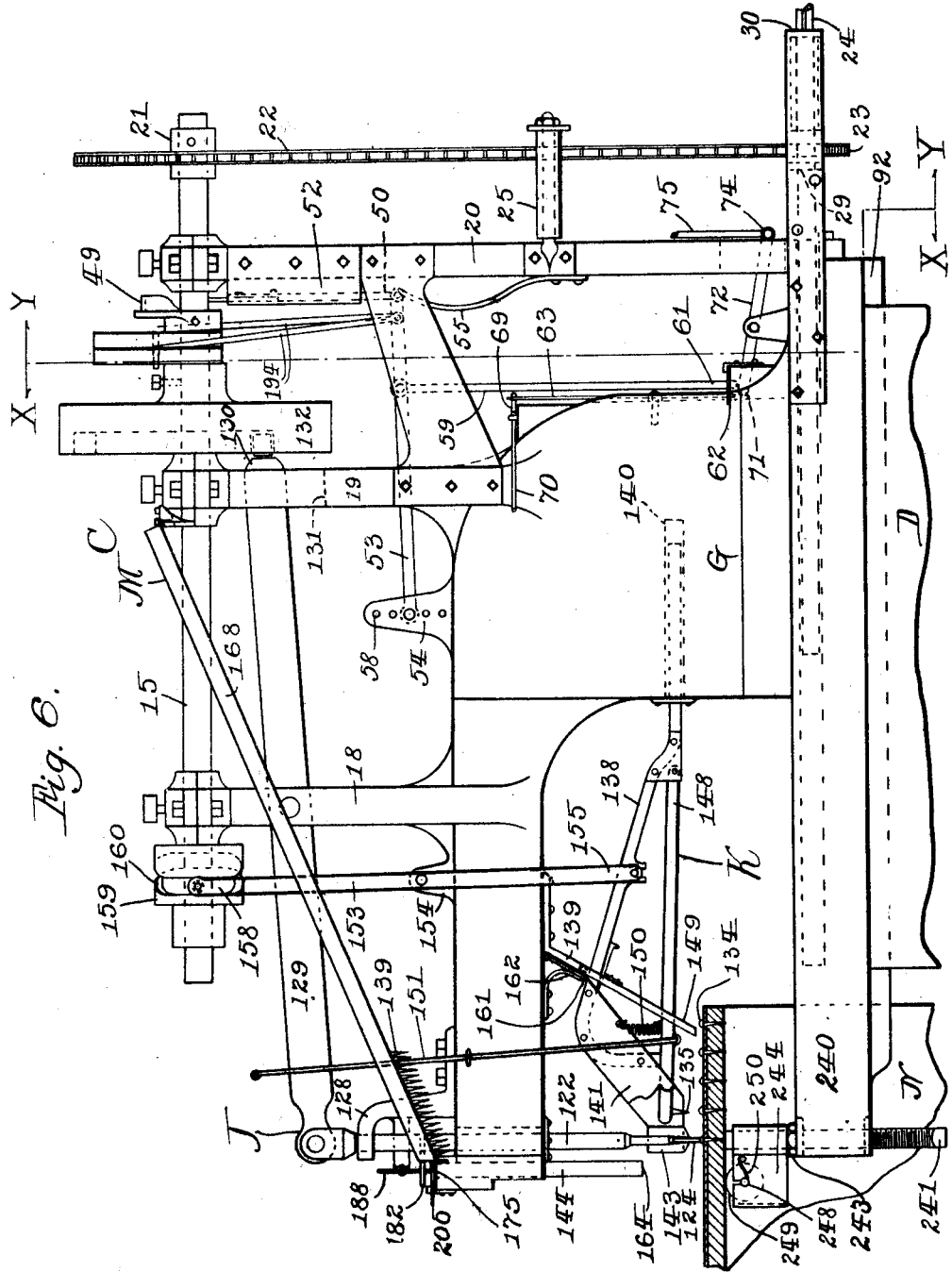

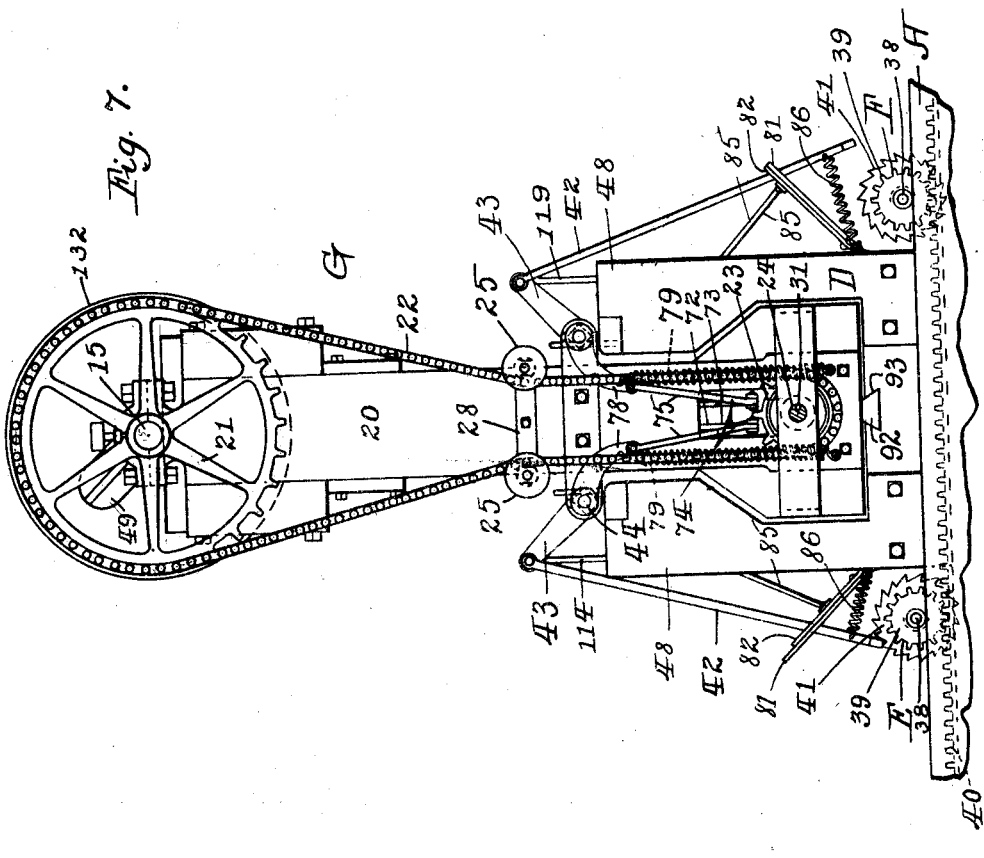

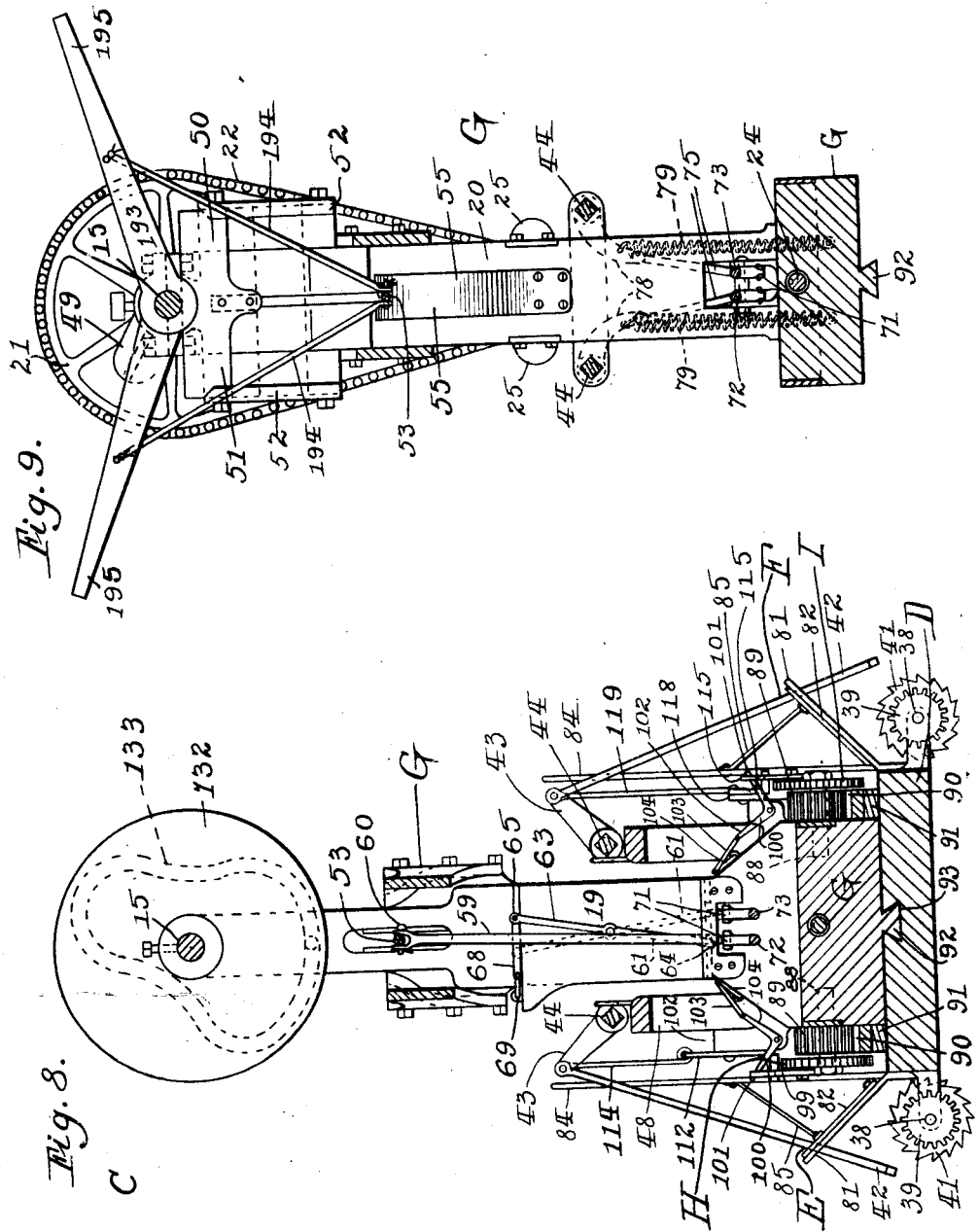

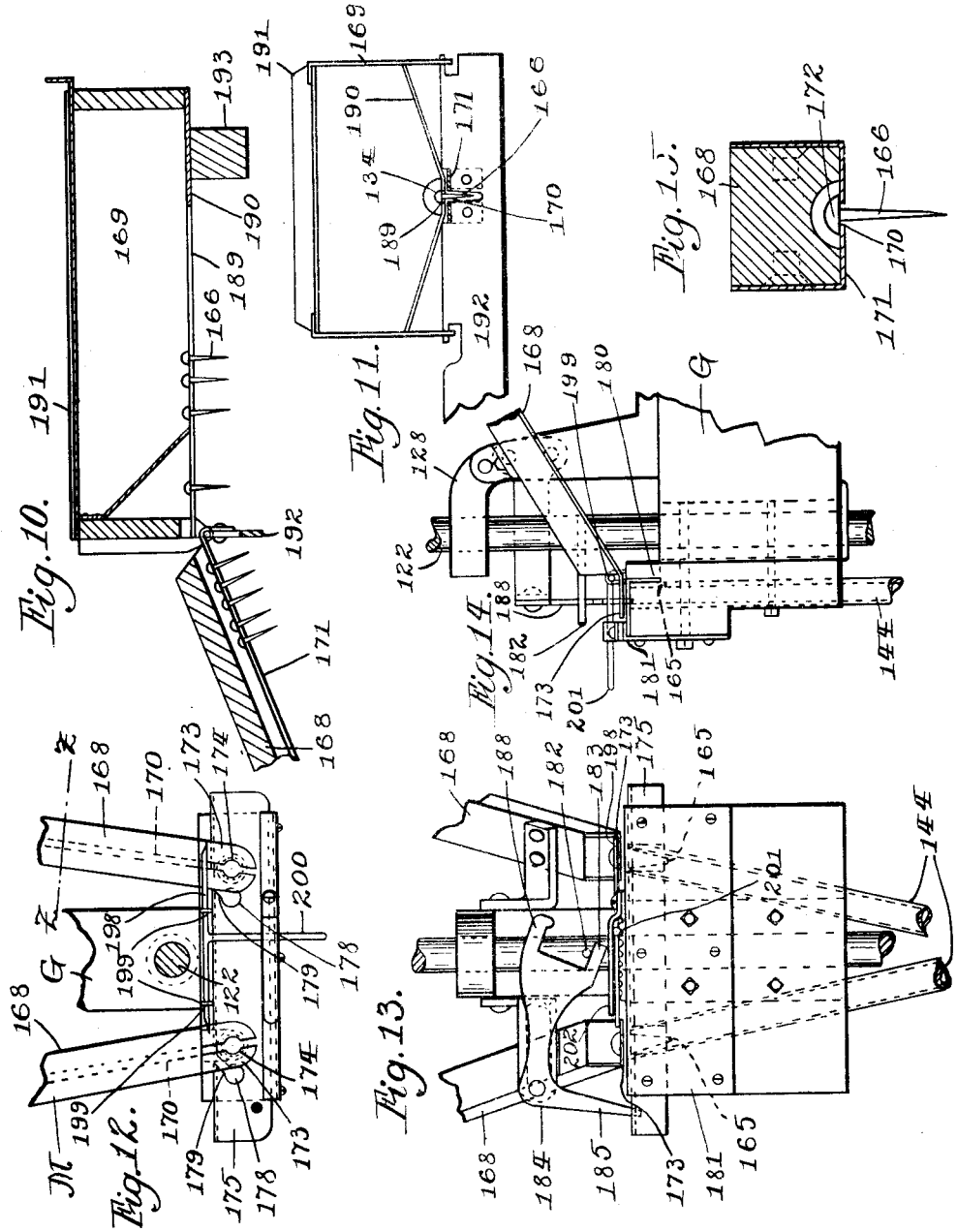

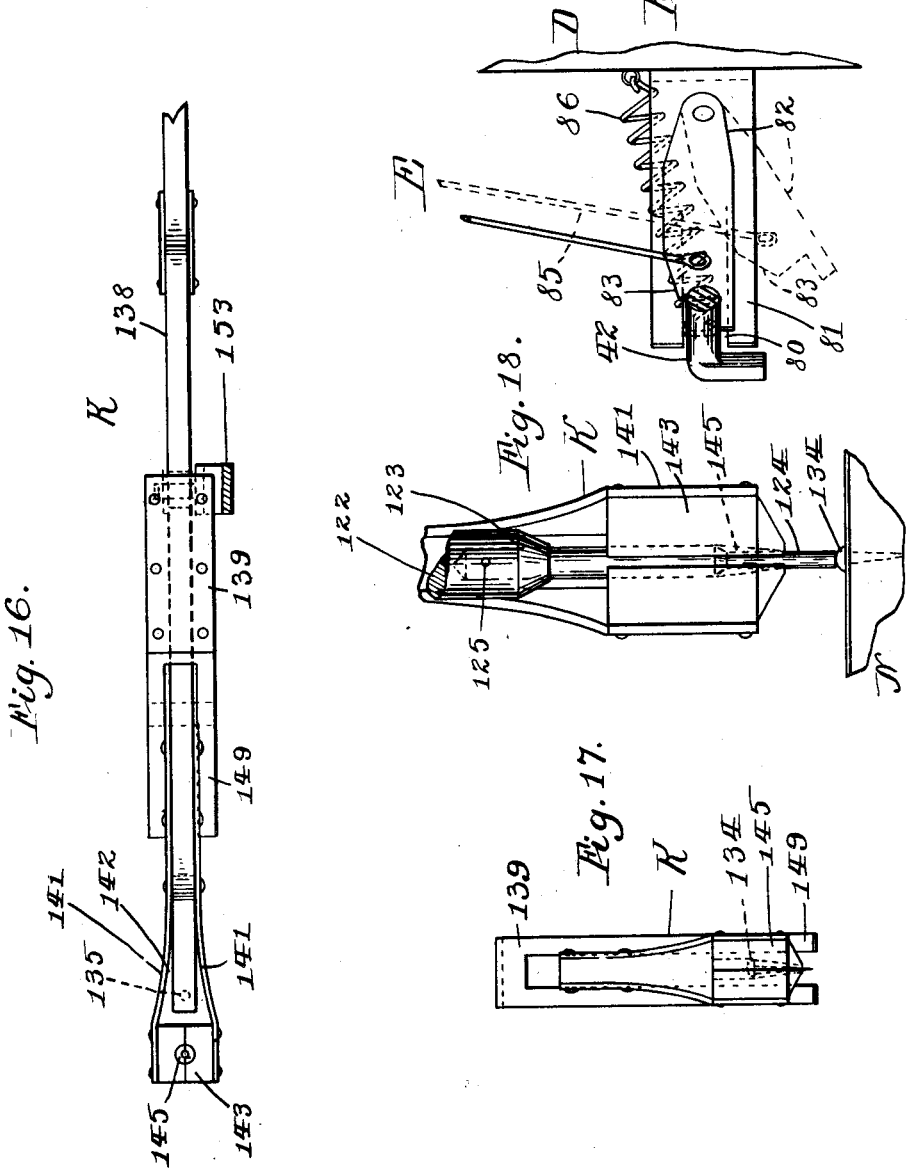

UNITED STATES PATENT OFFICE.

THOMAS G. CUMMINGS, OF FARGO, NORTH DAKOTA, ASSIGNOR OF ONE-HALF TO PATRICK GRANT, OF GRAND RAPIDS, MICHIGAN.

AUTOMATIC NAILING-MACHINE.

1,109,739.

Specification of Letters Patent.

Patented Sept. 8, 1914.

Application filed January 4, 1911. Serial No. 600,773

*To all whom it may concern:*

Be it known that I, THOMAS G. CUMMINGS, a citizen of the United States, residing at Fargo, in the county of Cass and State of North Dakota, have invented a new and useful Improvement in Automatic Nailing-Machines, of which the following is a specification.

My invention relates to an improved automatic nailing machine and has as its object the design of a machine that will drive nails through any hard material or series of materials, the nails being driven singly and spaced at adjustable predetermined intervals. My device is designed to drive nails through thin sheet metal if necessary and to clench the nails on the inside of the material nailed. The nailing mechanism and holder for the material to be nailed are each made adjustable, one automatically and the other by hand, in order to give access to all parts of the surface to be nailed.

This machine is particularly, although not exclusively, adapted for securing the frame and parts together in the manufacture of trunks.

Figure 1:
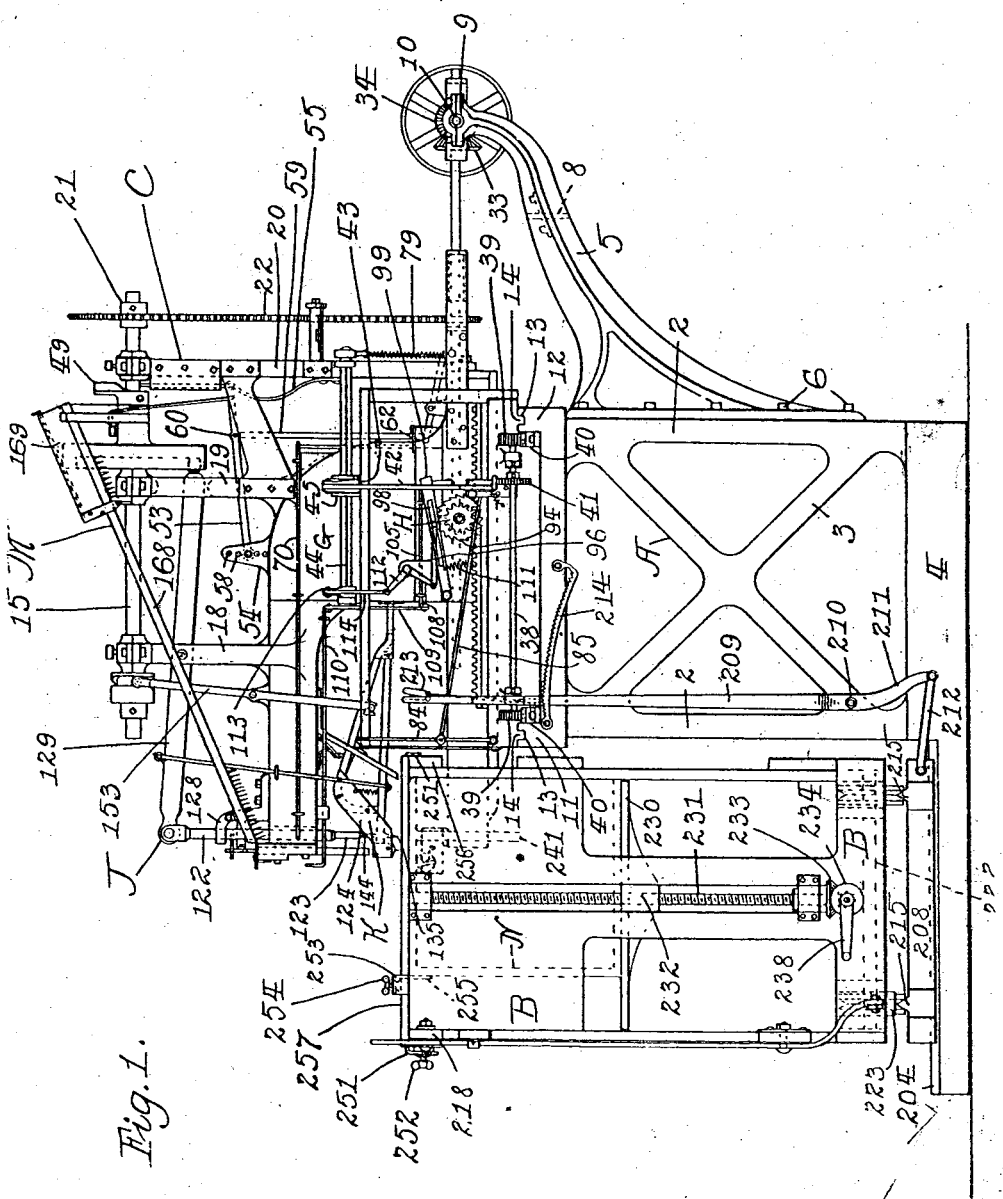
Figure 2:
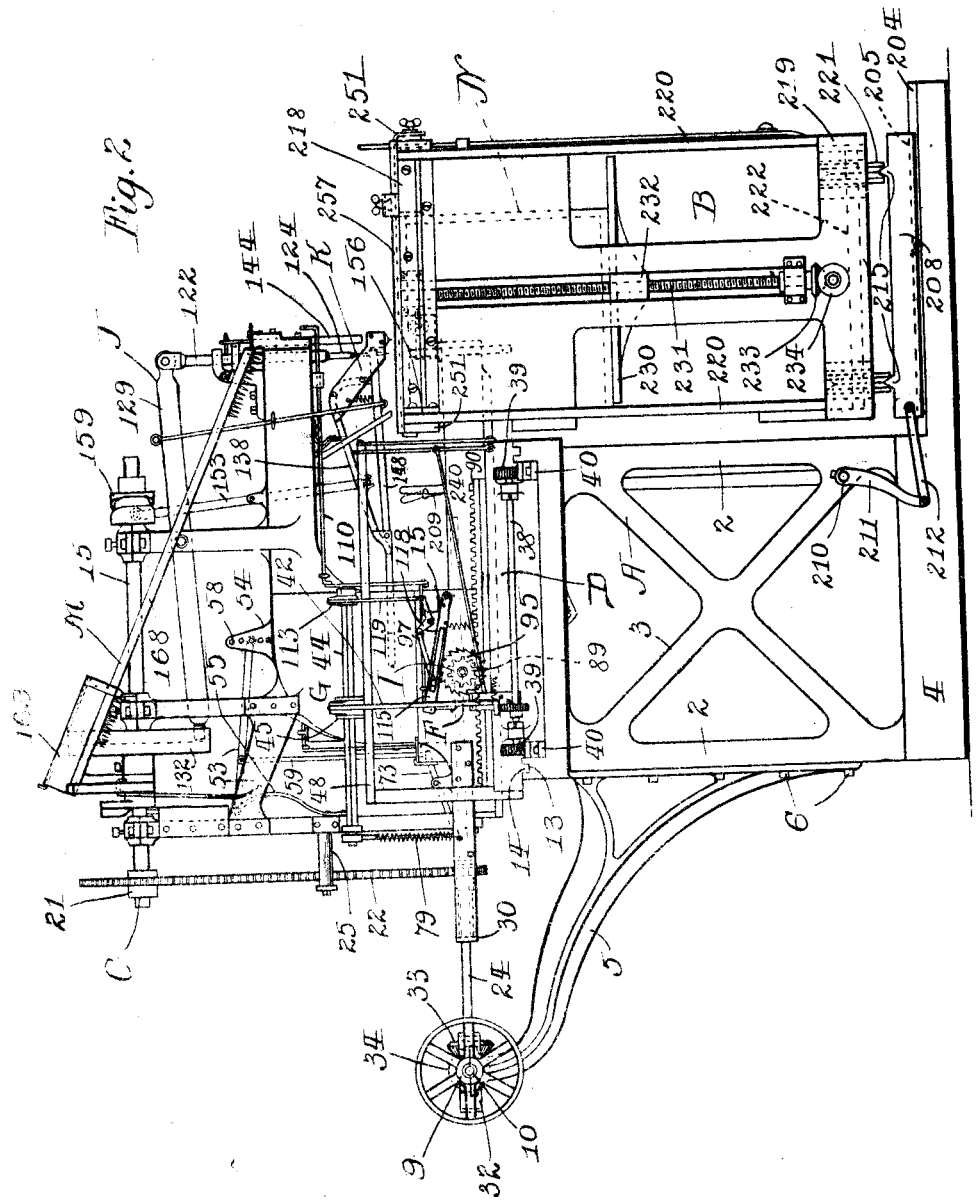
Figure 3:
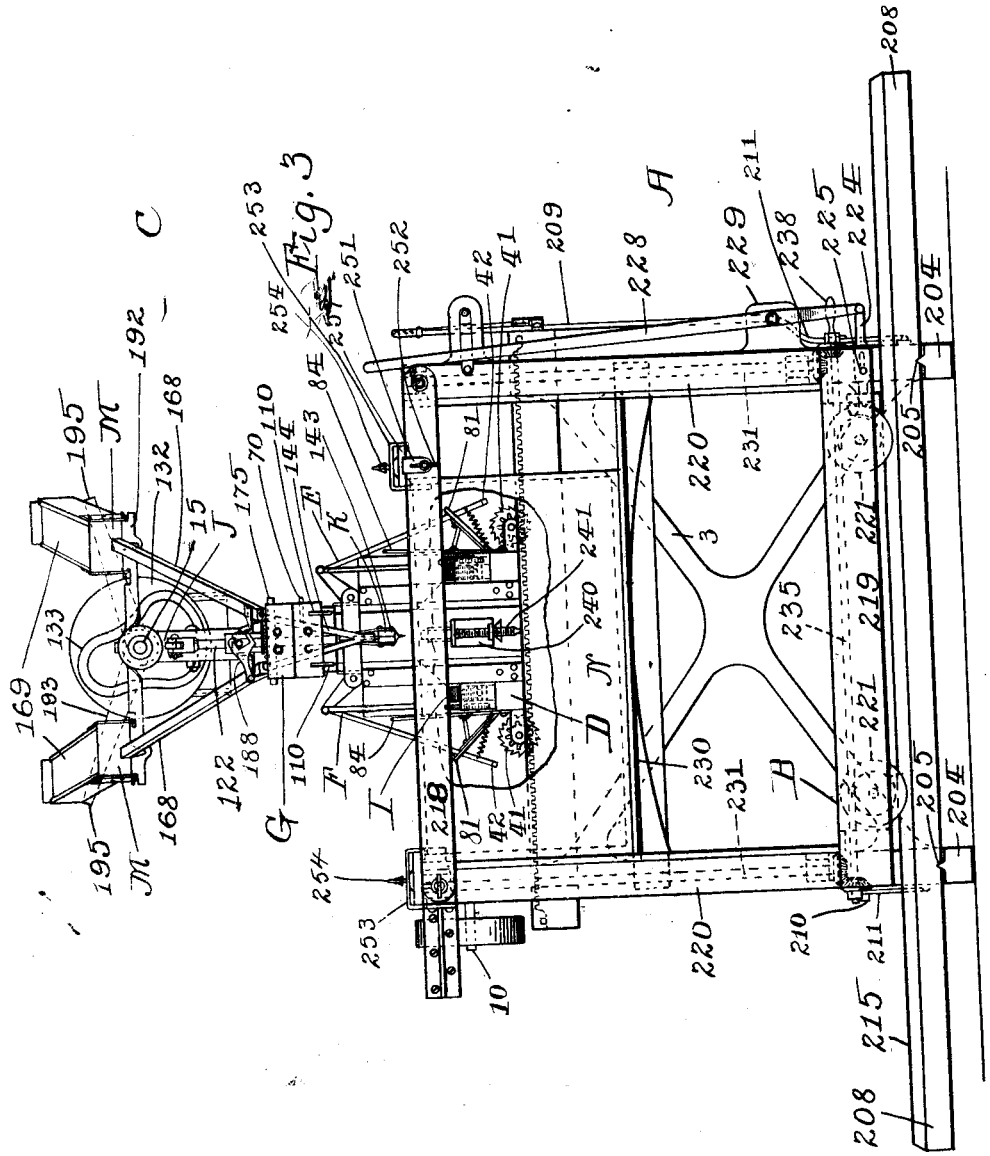
Figure 4:
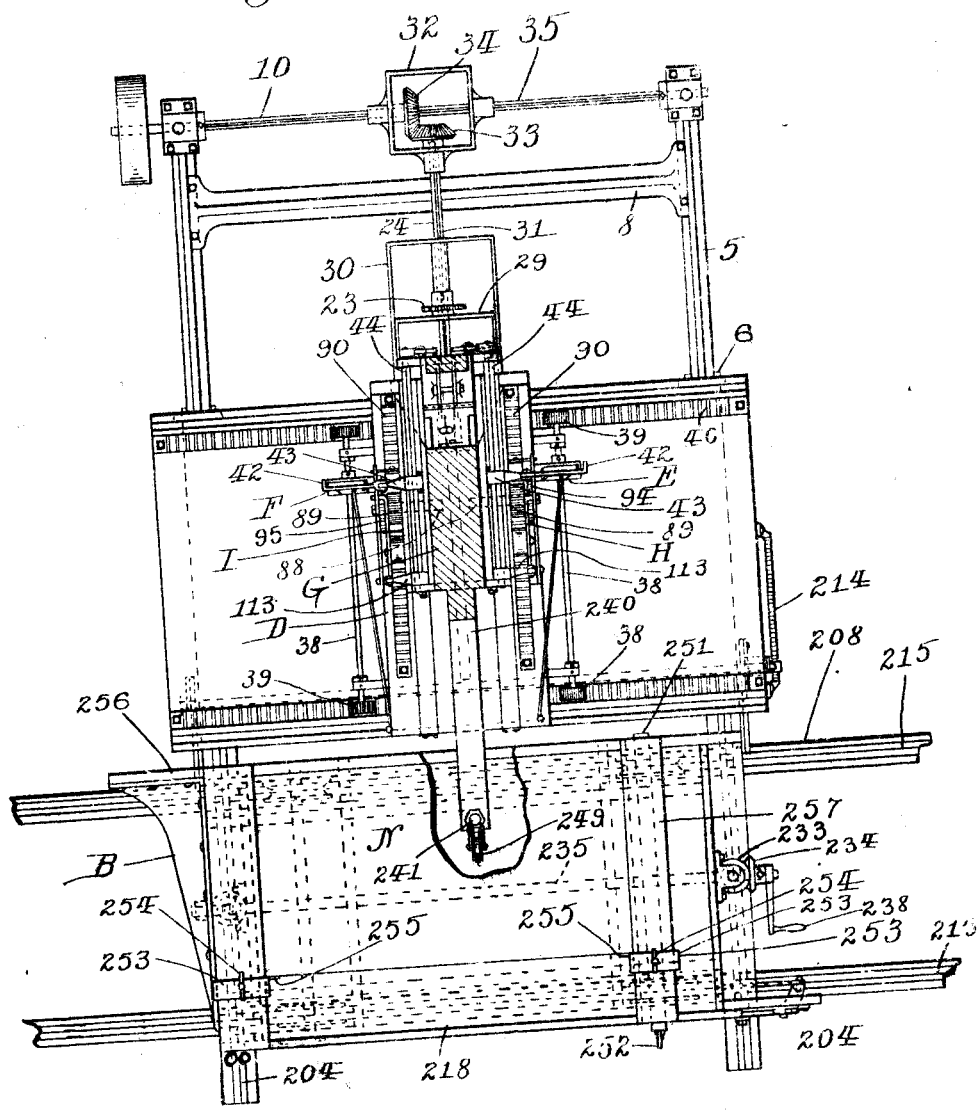

In the drawings with which I have illustrated my machine and which form part of my specification, Figures 1 and 2 are side elevations of my machine; Fig. 3 is an end view of the front or nailing end of my machine; Fig. 4 is a sectional plan showing the propelling mechanism; Figs. 5 and 6 are enlarged elevations of the nailing head showing two positions of the driver; Fig. 7 is an end elevation of the head as shown in Fig. 6; Fig. 8 is a section on the line X—X, Fig. 6; Fig. 9 is a section on the line Y—Y, Fig. 6; Figs. 10 to 14 inclusive are enlarged details of the nail feed; Fig. 15 is an enlarged section on the line Z—Z, Fig. 12; Fig. 16 is a plan of the nail holder; Fig. 17 is a front view of the same; Fig. 18 is a front view of the nail holder in connection with the driver, and Fig. 19 is a detail of the propelling mechanism.

In a general way my device consists of a supporting frame A carrying a movable trunk frame B supporting a trunk N and a traveling nailer C. The nailer is made up of a base D carrying the lateral propelling mechanisms E and F and a head G movable on the base D and carrying the backward propelling mechanism H and forward propelling mechanism I, a driving mechanism J, a nail holder K, and a nail feed M.

*Supporting frame.*—The supporting frame A which supports the nailer C consists of suitable legs 2 with braces 3, resting on sills 4 which also carry the trunk frame B. Brackets 5 attached to the legs 2 by bolts 6 and spaced apart by the cross frame 8, have boxes 9 at their extremities in which is journaled a power shaft 10. The top frame consists of front and back pieces 11 and 12 having laterally extending grooves 13 in which slide tongues 14 fixed to the under side of the base D.

*Actuating mechanism.*—An operating shaft 15 is journaled in supports 18, 19 and 20 on the nailer head G. A sprocket wheel 21 is keyed on the rear end of the operating shaft 15 and is connected by a sprocket chain 22 with a sprocket 23 on the slip shaft 24. The sprocket chain 22 passes between two idle pulleys 25 mounted on the yoke 28 (see Fig. 7) which is bolted to the support 20. The shaft 24 is journaled in the yoke bearings 29 and 30 (see Figs. 4 and 6) between which lies the sprocket 23 attached to the shaft by a feather 31 allowing the movement of the sprocket 23 along the shaft 24 in the forward and back movement of the nailer head G. The rear end of the slip shaft 24 is carried by a gear frame 32 mounted thereon and on the power shaft 10, carrying the bevel gear 33 on the end of the slip shaft 24 and the intermeshing bevel gear 34 which slides on a feather 35 on the power shaft 10.

*Lateral propelling mechanisms.*—The relation of the parts allows a lateral motion of the nailer G and the base D parallel with the power shaft 10. This movement is secured through the lateral propelling mechanisms E and F which, in operation, move the nailer in opposite directions. The mechanism E consists of a longitudinal shaft 38 journaled on the side of the base D and having a pinion 39 at either end meshing with a rack 40 (see Fig. 7) mounted on the frame A. A ratchet wheel 41 is mounted on the shaft 38 to operate it, and is driven by a pallet 42 pivoted to the arm 43 which slides longitudinally on the rock shaft 44. The rock shaft 44 is carried by the head G and operates the backward propelling mechanism H while the arm 43 is held in the same relation to the base D by posts 45 on either side, which are fixed in a frame 48 integral with the base D. The rotation of the arm 43 with the shaft 44 is insured by the square cross-section of the shaft (see Fig. 8).

The rock shaft 44 is operated from the operating shaft 15 by a system of levers and links driven by a cam 49 (see Fig. 6) which is mounted on the shaft 15. The cam 49 at each revolution of the shaft 15 forces down the follower 50 which is formed with a cross head 51 sliding in guides 52 and is attached to one end of the the lever 53 pivoted adjustably in the brackets 54 on the nailer head G. The return movement of the follower is secured by a compression spring 55 fixed to the support 20 and attached to the lower end of the follower 50. We show a series of pin holes 58 in the brackets 54, which may be used to adjust the elevation of the fulcrum of the lever 53 and in this way adjust the stroke of the plunger 59 which is pivoted thereto at the point 60. The plunger 59 plays freely at its connection to the lever 53 and its lower end 61 is positioned laterally by a guide plate 62 through which it passes and which is slidable horizontally. The guide plate 62 is controlled by a vertical lever 63 pivoted on the head G and having its lower end 64 fitted to a recess in the guide plate. The upper end 65 of the lever 63 is operated by a link 68 connecting to a crank 69 on the hand lever 70 (see Figs. 6 and 8). The operation of the hand lever 70 positions the lower end 61 of the plunger 59 over the ends 71 of either of two similar levers 72 and 73 or between them where neither lever is operable by the action of the plunger 59. The lever 72 is pivoted between its ends upon the head G and carries at its rear end 74 a link 75 connecting with an arm 78 (see Fig. 7) on the end of the rock shaft 44 to operate it. The return movement of the rock shaft 44 is secured by a tension spring 79 attached to the arm 78 and to the base D.

The lower end of the pallet 42 which engages the ratchet wheel 41 moves in the slot 80 in a guide 81 which is attached to the base D at one end. The end of the pallet is connected to the base D by a tension spring 86 which tends to hold the pallet 42 upon the ratchet wheel 41. On the guide 81 is pivoted a disengaging bar 82, the movement of which forces the bevel side 83 of the bar against the pallet 42 and moves the pallet out of engagement with the ratchet wheel 41. The disengaging bar 82 is controlled by a hand lever 84 (see Fig. 1) pivoted on the base D and operating a link 85 which connects the lever 84 and bar 83. The operation of the hand lever 84 disengaging the pallet 42 permits the operation of the rock shaft 44 and its connected mechanism H without moving the mechanism E.

In other words the nailer head G can be moved backward without being moved sideways.

The lateral propelling mechanism F is similar to E in all its parts which are positioned symmetrically with respect to E about the axis of the nailer G. The operation of the machanism F is secured from the operating shaft 15 through the plunger 59 and lever 73 by operating the hand lever 70 to throw the plunger 59 into connection with the lever 73.

*Longitudinal propelling mechanism.*— The mechanisms H and I for the longitudinal movement of the nailer head consist of stud shafts 88 fixed in the head G and lying transversely thereof, each carrying a pinion 89 engaging a rack 90 mounted on the base D by means of which the movement of the head G relative to the base D may be secured. Guide strips 91 on the base prevent lateral movement of the head upon the base, and a beveled tongue 92 sliding in a groove 93 in the base D prevents the lifting of the head G from the base D. In connection with the pinions are two oppositely directed ratchet wheels 94 and 95 (see Figs. 1, 2 and 8), one in connection with each pinion 89, operated by pallets 96 and 97 respectively. The pinions are integral with the ratchet wheels and are journaled on the shafts 88.

The pallet 96 of the mechanism H moves in a slot 98 in a guide bar 99 (see Fig. 1) which is pivoted at one end to the head G and is controlled by a transverse bell crank 100 (see Fig. 8) pivoted on the head, having one arm 101 engaging a slot in the end of the guide bar and the other 102 connected by a link 103 to a crank 104 on the rock shaft 105. The rock shaft 105 is operated by its connected crank 108, link 109 and the hand lever 110 carried by the head G and attached to the link 109. The upward movement of the crank 104 raises the guide bar 99 and throws the pallet 96 out of engagement with the ratchet wheel 94 where it is normally held by a tension spring 111 connecting the guide bar 99 with the head G. The pallet 96 is pivoted to a bell crank 112 pivoted on the head G and operated by the arm 113 on the rock shaft 44, through the link 114. Figs. 1, 2 and 8 show the pallets 96 and 97 in their disengaged positions.

The pallet 97 of the mechanism I moves in the guide bar 115 connected and operated similarly to the bar 99 in the mechanism H. The pallet 97 (see Figs. 2 and 8) is connected through a bell crank 118 to a link 119 and the arm 113 of the rock shaft 44 on its respective side of the nailer. The bell crank 118 is provided with upwardly extending arms so that the downward movement of the rock shaft arm 113 produces a forward movement of the ratchet wheel.

The operation of the proper hand lever 110 and rock shaft 44 will thus move the nailer head G forward or back while the adjustment of the lever 53 in the brackets 54 determines the distance traveled by each movement of the pallet 96 or 97.

*Nail driving mechanism.*—The driving mechanism J consists of a vertical rod 122 mounted slidably at the extreme front of the nailer head. The lower end 123 of the rod 122 is recessed to receive a removable driving point 124 which is in extension of the reciprocating driving rod 122 and is held in position by a suitable pin 125. The upper end of the rod is guided by an apertured bracket 128 attached to the head G and is pivoted to one end of a walking beam 129 which is fulcrumed in the support 18 and whose other end 130 passes through a guide slot 131 (see Fig. 5) in the support 19 and engages the grooved cam wheel 132 fixed on the operating shaft 15. The cam groove 133 of the cam wheel 132 provides a long and short reciprocation of the walking beam 129 and driver rod 122 at each revolution of the shaft 15, of which the long motion is utilized to drive a nail 134 held by the holder K and the short motion is used to operate the punch 135 connected with the holder K.

A supporting bar 240 is fixed to the nailer head G extending forward and carrying at its extremity directly beneath the driver rod 122, a clencher post 241 of metal, having a flat upper surface 242 (see Fig. 5) to carry the material 152 to be nailed and to clench the points of nails 134 driven through the material. The post 241 is adjustable vertically in the bar 240 by a nut 243 threaded on the post. The post 241 carries a swing frame 244 having slots in its sides in which slide the bearings 248 of an antifriction wheel 249 which is supported by springs 250. This wheel 249 is fitted to support the side of a trunk N to be nailed, to allow its movement laterally for adjustment.

The nail holder K consists of a longitudinally reciprocating frame 138 (see Figs. 6 and 16) carried by a guide bracket 139 fixed to the head G and a recess 140 in the head which permits a free longitudinal movement of the frame. The front end of the frame 138 carries a pair of obliquely disposed lateral spring jaws 141 which are spaced apart in their middle portion 142 to allow the passage of the driving point 124 and at their forward extremities 143 are recessed to receive and hold a nail 134 delivered by the nail feed pipe 144, the recessed extremities 143 being held together by the spring of the jaws. The recess 145 of the jaws 141 is so shaped that a nail dropping in point first from the top, is held fast by its head at the constricted part of the recess until the driving point 124 enters the recess and starts to drive the nail. The driving point 124 in its farther descent spreads the jaws 141 until they clear the head of the nail and the driving operation is completed.

*Punching mechanism.*—Below the frame 138 of the holder K lies the punch bar 148 pivoted to the frame 138 at one end and carrying at its other end the dependent conical punch point 135 which lies between the spaced apart jaws directly behind their recessed extremities 143. The punch bar 148 moves between guides 149 which are integral with the slotted bracket 139 and is operated when in its proper position by the driving point 124 of the nailer which presses down upon it directly above the punch point 135. The bar 148 is held normally in position by a compression spring 150 lying between it and the jaws 141 and after being operated is raised by a yoke 151 pivoted to the bar 148 and to the walking beam 129 of the nailer G which raises the punch 135 out of engagement with the material 152 into which it has been forced. The movement of the frame 138 longitudinally to bring the recessed jaws 143 into the proper relation with the nail feed 149 and later with the driving point 124, and to bring the punch 135 under the driving point 124, is secured by a vertical walking beam 153 fulcrumed in a bracket 154 on the nailer head G having its lower end 155 pivoted on the frame 138 and its upper end 158 engaging a grooved cam wheel 159 on the operating shaft 15. The groove 160 of the cam wheel 159 is so formed that the recessed jaws 143 of the holder K are presented at the nail feed 144 and the punch 135 is brought under the driving point 124 at the moment the nailer 122 starts its short or punch stroke and the jaws are again moved with the recess 145 under the driving point 124 as the nailer 122 starts its long or driving stroke. The return movement of the frame 138 is assisted by the hinged plate 161 operated by the spring 162 into impingement against the pin 163 (see Fig. 5) fixed in the top of the frame 138.

*Nail feeding mechanism.*—Nails are presented to the holder K singly by the nail feed M through the feed pipe 144 which is carried on the front of the nail head and has its delivery opening 164 in front of the driving point 124 and directly above the recess 145 when the holder K is in its forward position. The upper end of the feed pipe 144 has a slot 165 (see Fig. 13) in its side to receive the body 166 of the nail 134 held vertical. The nails 134 are carried by gravity down a chute 168 from the nail hopper 169. The chute 168 is formed with a substantially rectangular cross section having a continuous slot 170 in its bottom 171 and extending from the hopper 169 to the feed pipe 144 and of sufficient width to receive the body 166 of a nail hanging vertical with its head 172 within the chute 168. At its lower end 173 the slotted bottom 171 of the chute 168 is extended over the upper end of the feed pipe 144 and the slot 170 is widened at that point to an aperture 174 large enough to permit a nail head 172 to pass through, dropping the nail into the pipe 144, point first.

Between the lower end 173 of the chute 168 and the feed pipe 144 is interposed a plate 175 having an opening 178 to register with the pipe 144 and aperture 174 of the chute slot, and a diagonal slit 179 extending from this opening 178 to the rear edge of the plate out of alinement with the slots 170 and 165 in the chute and pipe. This plate 175 constitutes the nail feed control. By moving the plate 175 laterally the rear portion of the slit 179 may be brought into alinement with the slots 170 and 165 in the chute and pipe permitting a single nail body descending the chute 168 by gravity to enter the space thus opened. The return movement of the plate 175 cuts off the descent of the nails which follow and causes the nail in the slit 179 to move along it and at the same time traverse the slot 170 in the chute bottom. When the nail reaches the aperture 178 in the plate, that aperture registers with the feed pipe 144 and the aperture 174 and the nail 134 is free to fall. In this way nails are fed singly to the feed pipe 144 and into the holder K.

The controlling or cut off plate 175 slides in a groove 180 of the head and under the guide plate 181 and is operated by a pin 182 (see Fig. 13) on the driver rod 122 during the driving stroke of the rod. In its downward movement the pin 182 carries with it the lower arm 183 of the bell crank lever 184 which has one arm 185 engaging the feed control plate 175. The plate 175 is thus moved into the position shown in Fig. 12 to receive a nail 134 from the chute 168. The pin 182 in its upward movement impinges on the upper arm 188 of the lever and reverses the movement of the plate 175 carrying the nail 134 to the feed pipe 144 as described in the previous paragraph. The upper and lower arms 183 and 188 are so spaced that during the succeeding short stroke of the driver rod 122 the pin 182 does not reach the lower arm 183 and does not operate the plate 175 until the next succeeding drive stroke. By positioning the pin 182 on the driver rod 122 the dropping of the nail 134 is suitably timed with respect to the action of the holder K.

Nails are supplied to the chute 168 from the rectangular nail hopper 169 formed with a longitudinal slot 189 in its bottom 190 and in alinement with the slot 170 of the chute 168. The slot 189 is formed to receive the body 166 of a nail and to allow it to slide down toward the chute 168. The hopper 169 has a removable cover 191 which may be fastened in a closed position in any desirable manner, and is pivoted at its forward end on a transverse support 192 fixed to the support 19 on the nailer head G and is oscillated in a vertical plane by an agitator 193 loosely journaled on the operating shaft 15 and operated by rods 194 pivoted to the arm 195 of the agitator 193 and to the lever 53.

In my device as shown, the nail feed M is designed for two kinds of nails and is provided with two hoppers 169, chutes 168, control openings 179 and feed pipes 144. When not using one kind of nails the corresponding chute 168 may be closed by the sliding stop 198 (see Fig. 12) which is carried by loop bearings 199 and operated by a handle 200 which normally rests in a notch 201 and is held in position by a spring 202. The stop 198 may be slid laterally to close either chute 168 and open the other one. The agitator 193 is designed accordingly, having two arms 195 which alternately raise and lower the rear ends of the nail hoppers 169 above and below the horizontal position, thus agitating the loose nails therein and allowing them to fall into the slots 189 and feed into the chutes 168 in a vertical position. The number of hoppers 169 may be changed without in any way modifying the action of our device.

*Trunk carrier.*—On the sills 4 of the frame A are two tracks 204 of triangular cross section extending from the legs 2 to the ends of the sills 4 and fitting grooves 205 in a transverse table 208 which rests on them and which is moved longitudinally of the nailer by a hand lever 209 (see Fig. 1) mounted on a rock shaft 210 which is journaled in the frame A and which transmits its motion to arms 211 and links 212 which are connected to the transverse table 208 to operate it. The lever 209 is fitted with a spring latch 213 engaging a rack 214 attached to the frame A. On the transverse table 208 are two tracks 215 of triangular cross section extending transversely of the nailer. These tracks 215 carry the trunk frame B which consists of rectangular top and bottom frames 218 and 219 spaced apart vertically by corner posts 220. The frame B is supported on grooved wheels 221 traveling on the tracks 215 and journaled on shafts 222 fixed in the bottom frame 219. The transverse position of the frame B is determined by the operator who moves it on the wheels 221 as desired and can lock it in position by means of a brake shoe 223 which engages one of the wheels 221. The shoe 223 is mounted on a rod 224 slidable on the pin 225 fixed in the frame A, and operated by the hand lever 228 to which it is pivoted and which is fulcrumed on the lug 229 on the post 220 of the frame B. Within the frame B is a horizontal platform 230 vertically adjustable on vertical screws 231 operating in threads in lugs 232 on the ends of the platform, and operated at their lower ends by beveled gears 233 which engage gears 234 on the shaft 235 which is journaled in the bottom frame 219. The shaft 235 is rotated by a crank 238 to adjust the height of the platform 230.

*Operation.*—A trunk N placed on the platform 230 may be adjusted to the right elevation to rest one of its sides on the clencher post 241 for the driving of nails 134 in that side. A clamp 257 having down turned ends 251, rests on the top frame 218 engaging its sides and has a set screw 252 in one of its ends 251 to fix the clamp in any desired position against the end of the trunk N, to prevent its movement transversely of the nailer. A sliding stop 253 mounted on the clamp 257 has a set screw 254 fixing it adjustably on the clamp 257 and a lug 255 engaging the side of the trunk N to hold it against the side piece 256 of the top frame 218 and prevent its motion longitudinally of the nailer.

By the operation of the lever 209 and the crank 238 on the movable frame B the trunk N can be adjusted to nail any portion of its upper surface and can be clamped in that position by the clamp 257, stop 253 and the brake lever 228. For the operation of the nailer the levers 70 and 110 control the forward and back motions, and levers 70 and 84 control the lateral motions while the adjustment of the lever 53 controls the extent of these motions and the spacing of the nails in the trunk.

A trunk N and its sheathing material to be nailed, is placed in the frame B and adjusted under the driver. The propelling mechanisms are adjusted for a longitudinal or transverse series of nails as desired. The nail hoppers are filled with the required sizes of nails and the stop 198 is positioned to pass nails from the hopper from which nails are to be used immediately. The operating mechanism is set in motion and the nailer head G is advanced step by step driving a series of nails in the intervals between lateral movements, which are spaced equally along a straight line in the direction of motion, of the head G. The direction of motion, size of nail and space between nails may be changed as described above in detail, and for the trunk may be substituted any material within the capacity of the machine.

In accordance with the patent statutes I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. In a nail setting machine, a supporting frame, a driving mechanism mounted on said frame and having a nail driver, a nail feed adapted to deliver a nail adjacent to said nail driver, a nail holder adapted to hold a nail in a driving position, a punch adapted to form an aperture for a nail, means for presenting said holder to said nail feed to receive a nail and to said nail driver to drive said nail, and means for bringing said punch into coaction with said nail driver to punch a hole for said nail.

2. In a nail setting machine, a support, a nail driving head on said machine having a driver, and a nail holder and punch coöperating therewith; means on said support to move said head longitudinally and laterally thereof step by step, a holding frame mounted on said support to coöperate with said driving head and means connected therewith to position the same longitudinally or laterally on said support.

3. A nail setting machine, comprising in combination, a support, a drive shaft mounted on said frame, a pair of cam wheels mounted on said shaft, a nail driver mounted on said support and operated by one of said cam wheels, a nail holder having a punch connected therewith, and both movable into operative relation with said nail driver by means of the other of said cam wheels and a nail feed for loose nails adapted to deliver a nail to said holder in one position thereof during the operation of said punch, said holder then moving to position said nail under said driver.

In testimony whereof, I have signed my name to this specification, in the presence of two subscribing witnesses.

THOMAS G. CUMMINGS.

Witnesses:
JOHN MOUTON,
HANS J. PETERSEN.